United States Patent [19]
Harkness et al.

[11] 3,828,212
[45] Aug. 6, 1974

[54] ASSEMBLY OF ALTERNATOR MAGNET BLOCKS WITH ENGINE FLYWHEEL

[75] Inventors: Joseph R. Harkness, Germantown; John D. Santi, West Allis; Leo J. Lechtenberg, Elm Grove, all of Wis.

[73] Assignee: Briggs & Stratton Corporation, Wauwatosa, Wis.

[22] Filed: Dec. 12, 1973

[21] Appl. No.: 424,184

Related U.S. Application Data
[62] Division of Ser. No. 181,025, Sept. 16, 1971.

[52] U.S. Cl. ............... 310/153, 310/156, 310/42
[51] Int. Cl. .......................................... H02k 21/22
[58] Field of Search ....... 310/42, 43, 152, 153, 154, 310/74, 156

[56] References Cited
UNITED STATES PATENTS

| | | | |
|---|---|---|---|
| 2,048,161 | 7/1936 | Klaiber | 310/154 |
| 2,976,439 | 3/1961 | Kiekhafer | 310/42 X |
| 3,265,913 | 8/1966 | Irwin | 310/153 |
| 3,278,775 | 10/1966 | Eberline | 310/74 X |
| 3,368,275 | 2/1968 | Eberline et al. | 310/153 X |
| 3,521,096 | 7/1970 | Merriam | 310/154 |
| 3,581,394 | 6/1971 | Phelon | 310/156 |
| 3,657,582 | 4/1972 | Phelon | 310/156 X |
| 3,663,850 | 5/1972 | Phelon | 310/153 |

FOREIGN PATENTS OR APPLICATIONS

| | | | |
|---|---|---|---|
| 1,145,262 | 3/1963 | Germany | 310/153 |
| 1,073,602 | 1/1960 | Germany | 310/153 |
| 1,072,720 | 1/1960 | Germany | 310/153 |

*Primary Examiner*—D. F. Duggan

[57] ABSTRACT

To secure magnet blocks for an alternator in a cup-shaped flywheel, the inner surface of the flywheel side wall is coated with epoxy and an annular cage is axially inserted into the well in the flywheel. The cage cooperates with inner flywheel surfaces to define radially inwardly opening pockets, into each of which a block is inserted. A tool is disclosed for forcing the blocks radially outwardly to desired positions in which they are held by a fixture while the epoxy is cured.

6 Claims, 10 Drawing Figures

ASSEMBLY OF ALTERNATOR MAGNET BLOCKS WITH ENGINE FLYWHEEL

This application is a division of our copending application, Ser. No. 181,025, filed Sept. 16, 1971.

This invention relates to a rotor having a body which can comprise an engine flywheel and which carries a plurality of block-like permanent magnets for rotation with the body to cooperate with stationary elements of a dynamoelectric machine; and the invention is more particularly concerned with a method and means for securing permanent magnet blocks to such a rotor body in a predetermined relationship to it and to one another.

In many small gasoline engine applications it is desired to have an alternator that is powered by the engine to provide a source of current for charging a starter battery or for energizing headlights or the like. In such installations the alternator often comprises a ring of block-like permanent magnets carried by the engine flywheel for cooperation with a core and windings that are stationary on the engine body at a location adjacent to the flywheel. The flywheel in such cases is made of cast-iron, so that it not only has sufficient mass for its flywheel function but is also magnetically permeable to provide flux paths between the permanent magnets that it carries. Usually, too, the flywheel body is cup-shaped, with a front end wall and a generally cylindrical side wall that enclose the stationary elements of the alternator, and the permanent magnets are mounted in a ring around the inner surface of its side wall.

Various methods and means have heretofore been proposed for securing the several permanent magnet blocks to a flywheel body to provide a rotor assembly of the above described character, but all of these prior expedients have had the disadvantage of being relatively costly.

For example, U.S. Pat. No. 3,390,291, to Eberline et al, discloses a procedure in which a multiple-member die or mold is used to form a cast ring in which the magnet blocks are embedded to hold them in a desired circumferentially spaced relationship to one another. The cast ring is inserted into the flywheel body after the latter has been heated to expand it. Then, after the flywheel body has cooled to shrink into tight engagement with the ring, the inner surface of the ring is machined to expose magnet shoes associated with the magnets. This procedure, involving a multiplicity of operations and relatively expensive molding equipment, as well as waste of metal that is machined away, is obviously expensive.

U.S. Pat. No. 3,265,913, to I. J. Irwin, discloses an assembly procedure involving a substantially larger number of parts than that of the Eberline et al patent, and wherein the magnets are held assembled with one another and with the flywheel body by means of an arrangement of clamping rings, screws and other fasteners. While the expedient of the Irwin patent avoids the need for casting and machining operations, the multiplicity of parts involved and the complexity of the assembly are such that the Irwin rotor is in the same cost area as that of Eberline et al.

By contrast with these prior expedients, it is the general object of this invention to provide a rotor comprising a flywheel body or the like and a plurality of block-like permanent magnets that are secured to the body in a ring at circumferentially spaced intervals therearound, which rotor can be manufactured at substantially lower cost than any heretofore available.

More specifically, it is an object of this invention to provide a rotor of the character described that is very low in cost by reason of the fact that it incorporates a very minimum number of relatively simple parts and requires for its manufacture a very small number of operations, all of which can be performed very quickly and easily by relatively unskilled labor and with the use of simple and inexpensive tools and equipment.

Another object of this invention is to provide a method and means for assembling individual block-like permanent magnets directly into a cup-shaped rotor body such as an engine flywheel, to dispose the magnets in the proper relationship to the body in the very act of assembling them into a ring, thus avoiding the necessity for first assembling the magnets with one or more other components to provide a magnet ring that must subsequently be installed in the body.

Another object of this invention is to provide very simple and inexpensive means for properly locating magnet blocks in a desired relationship to one another and to a rotor body during an easily performed assembly operation, and for holding them in that relationship during the curing of an adhesive material by which the blocks are directly bonded to the rotor body.

It is also an object of this invention to provide a method and means for assembling permanent magnet blocks into an annular or cup-shaped rotor body, and for securing them therein, whereby such assembly can be accomplished in operations that are so simple and small in number as to be well adapted to being performed in whole or in substantial part with automated equipment.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Referring now more particularly to the accompanying drawings, the numeral 5 designates generally a rotor body member which carries a ring of permanent magnet blocks 6, and which is here shown as a flywheel of the type commonly used on single-cylinder gasoline engines. The blocks 6, when magnetized, cooperate with the stationary elements of an alternator (not shown) which can be mounted on the body of an engine upon which the flywheel is installed. As is conventional, the flywheel or rotor body 5 is generally cup-shaped, having an end wall 7 and a generally cylindrical or annular side wall 8, which walls cooperate to define an axially shallow rearwardly opening well 9. A coaxial bore 10 in the end wall is adapted to receive the crankshaft of an engine (not shown) on which the flywheel is mounted.

As is usual with flywheels for small engines, the rotor body member 5 here illustrated has vanes 11 projecting forwardly from the exterior surface of its end wall to blow cooling air across the engine on which it is mounted. As is also conventional, a permanent magnet 12 is embedded in the flywheel body and is exposed at its outer peripheral surface for cooperation with stationary elements of an ignition magneto (not shown) that is mounted on the engine body outwardly adjacent to the flywheel.

The block-like permanent magnets 6 are secured to the flywheel in circumferentially spaced relation to one another in a ring adjacent to the inner surface of the side wall 8. The blocks are so magnetized that adjacent ones have opposite polarity, and the rotor body is preferably made of cast iron to provide magnetic flux paths between them. The stationary alternator components with which the magnets 6 cooperate are mounted on the engine body within the embrace of the ring that the blocks define, where said alternator components are covered and protected by the flywheel.

The magnet blocks 6 are of arcuate shape, to conform to the curvature of the body side wall 8, and accordingly each has an arcuately convex radially outer surface 14 that is curved on the same radius as the inner surface of the side wall 8, a concave radially inner surface 15 that provides a pole face, flat, slightly arch-shaped front and rear surfaces 16 and 17, respectively, and rectangular flat side surfaces 18. The rectangular side surfaces lie in parallel planes, for reasons which will appear as the description proceeds, and hence lie only approximately on radials to the axis of the finished rotor.

In the finished rotor the magnet blocks are held in place by being bonded to the inner surface of the side wall 8 with an adhesive bonding agent such as epoxy resin. There is no substantial force upon the blocks that tends to break their bond to the body since they are magnetically attracted to it and are urged against it by centrifugal force.

An annular cage 19 of nonmagnetic material, preferably cast or molded in one piece, serves to establish the magnet blocks in their proper positions during the assembly operation, retains them in those positions while the bonding agent is curing, and protects them in the finished rotor. The cage can be molded of a plastic material such as nylon, but because the coefficient of thermal expansion of most plastics is substantially different from that of the cast iron of the rotor body, it is considered preferable to make the cage as a die casting of zinc or the like.

For assembly of the rotor body, a coating of epoxy resin is first applied to the inner surface of the rotor body side wall, all around the same, and then the cage is inserted axially into the well in the rotor body, in a predetermined rotational position. The cage cooperates with inner surface portions of the rotor body to define a plurality of radially inwardly opening pockets 20, one for each magnet block, and the magnet blocks are inserted radially into these pockets. The pockets are of such size that the magnet blocks fit them loosely enough to be quickly and easily installed by hand. As the blocks are inserted, the cage establishes them in desired positions relative to one another and the rotor body.

By means of a tool 21 (see FIGS. 3 and 4) that is described hereinafter, all of the blocks are simultaneously forced radially outwardly to displace so much of the bonding material as is necessary to bring their radially outer surfaces 14 to within a predetermined distance from the inner surface of the side wall 8, and then they are held in that position by means of a fixture 22 while the bonding material is cured.

Figure 1:
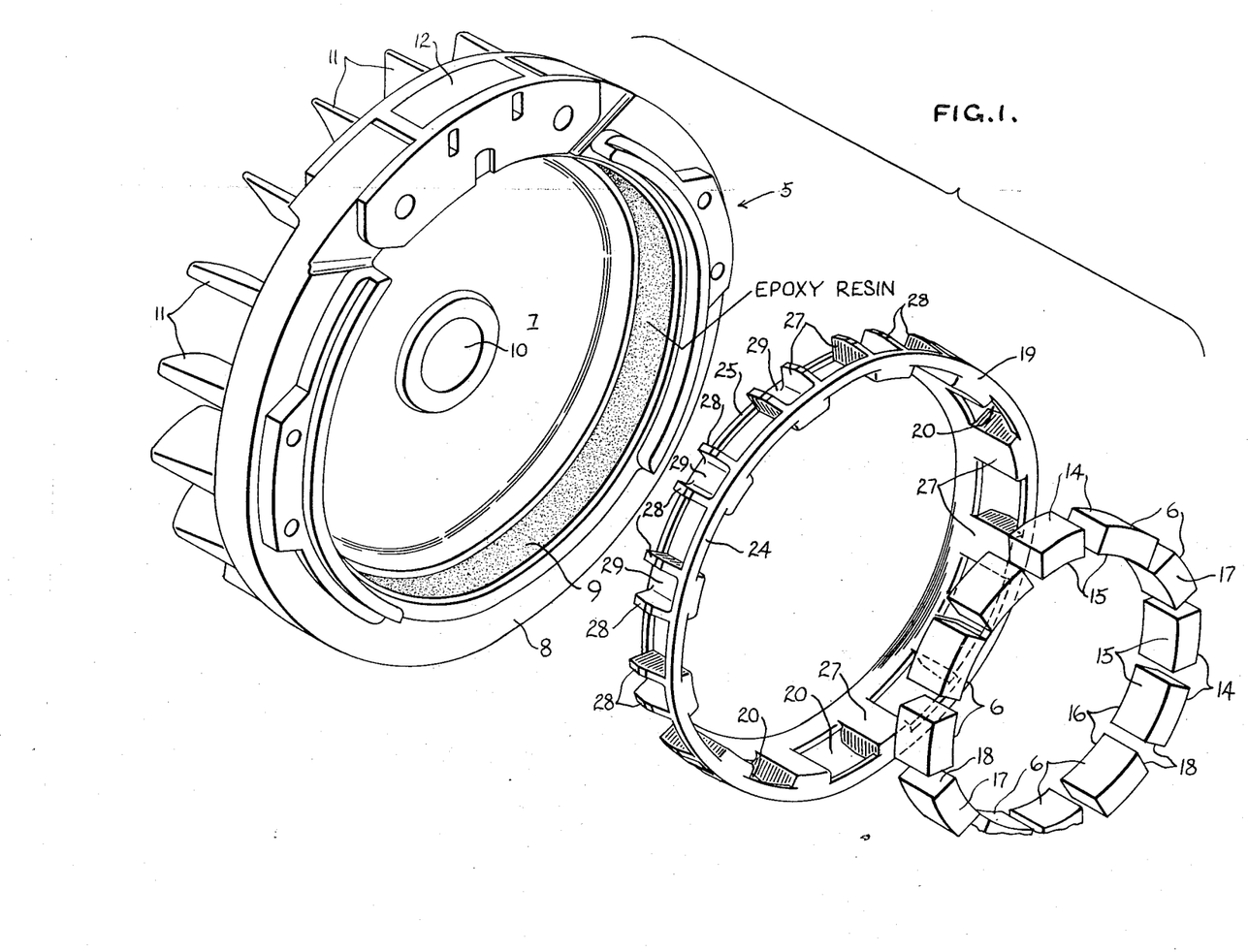
FIG. 1 is a disassembled perspective view of a rotor embodying the principles of this invention.

As shown in FIG. 1, the cage comprises front and rear rings 24 and 25 and spacer portions 27 which extend axially between the rings and connect them. The rear ring 24 flatwise overlies the rear faces 17 of the magnet blocks. The front ring 25, which can be relatively narrow radially, overlies the front faces 16 of the blocks and extends axially forwardly to hold the blocks axially spaced from the end wall and to seal off the space between them and the end wall. The spacer portions 27, which are equal in number to the magnet blocks, space the blocks apart circumferentially. Each of the spacer portions is generally channel shaped, having a pair of circumferentially spaced legs 28 that extend lengthwise axially and project radially outwardly from a web 29.

Figure 2:
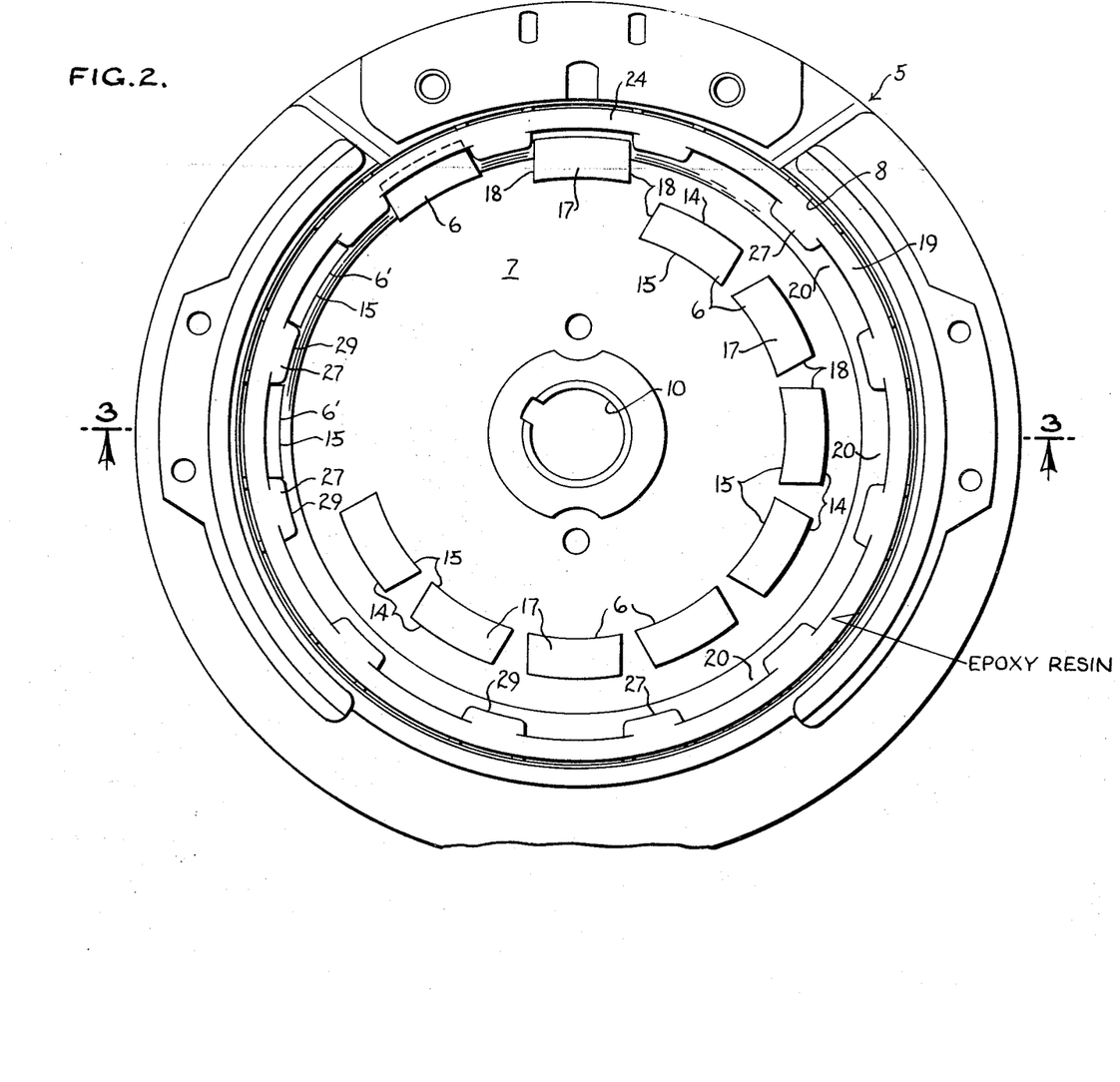
FIG. 2 is a plan view of the rotor in partially assembled condition.
Figures 3, 5:
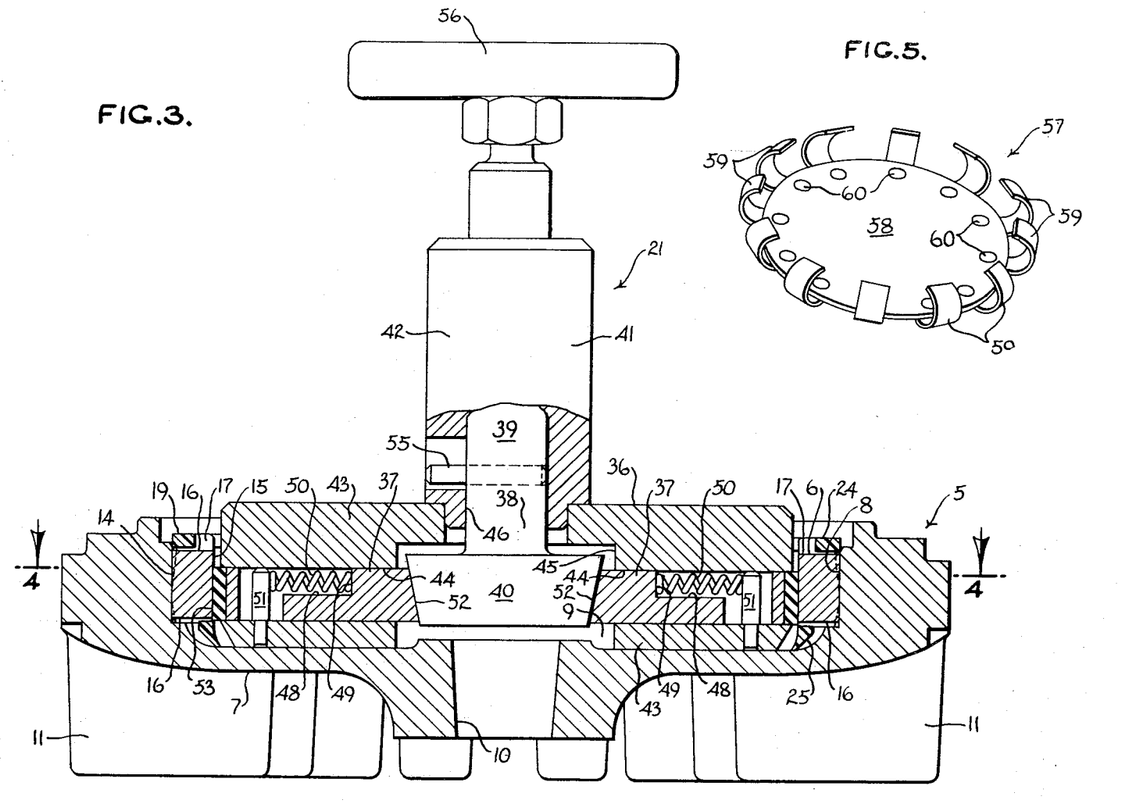
FIG. 3 is a view, partially in side elevation and partially in axial section, showing the rotor assembled with a tool that is employed for forcing the magnet blocks to their desired positions.
FIG. 5 is a perspective view of a fixture that is installed in the rotor during the epoxy curing operation.

As may be seen by reference to the magnet blocks 6' in FIG. 2, which are shown in the positions they occupy in the finished rotor, the radially inner surface of the webs 29 of the spacer portions are substantially flush with the inner surfaces 15 of the magnet blocks; and the radially inner surface of the front ring 25 on the cage, at the portion thereof that is axially adjacent to the magnet blocks, is likewise flush with said magnet surfaces and said web surfaces, as best seen in FIG. 3. Hence the cage cooperates with the magnets to provide a magnet ring in the rotor that has a relatively smooth inner surface. As a result, the cage affords protection to the magnets during assembly of the rotor onto an engine, and also protects the magnets from being dislodged by flying stones and the like that might enter through the space between the engine body and the rear edge of the rotor when the engine is in use.

The adjacent legs 28 of circumferentially adjacent spacer portions define opposing pocket surfaces which are parallel to one another and which overlie the parallel side surfaces 18 on a magnet block. By reason of the parallelism of these surfaces of the blocks and pockets, the blocks can have a relatively simple shape that facilitates their production, and they can be easily inserted radially into the pockets 20.

Note that no particular reliance is placed upon an adhesive bond between the cage and the rotor body to hold the cage of the FIG. 1 embodiment of the invention against displacement relative to the body. Instead, the magnet blocks are mainly relied upon to hold the cage in place by their engagement with the pocket defining surfaces of the cage. Since many plastics do not make a good bond with epoxy resin, the embodiment illustrated in FIG. 1 therefore lends itself well to rotor assemblies in which the cage is formed of plastic, in cases where the coefficient of expansion of the plastic presents no particular problem.

Figure 6:
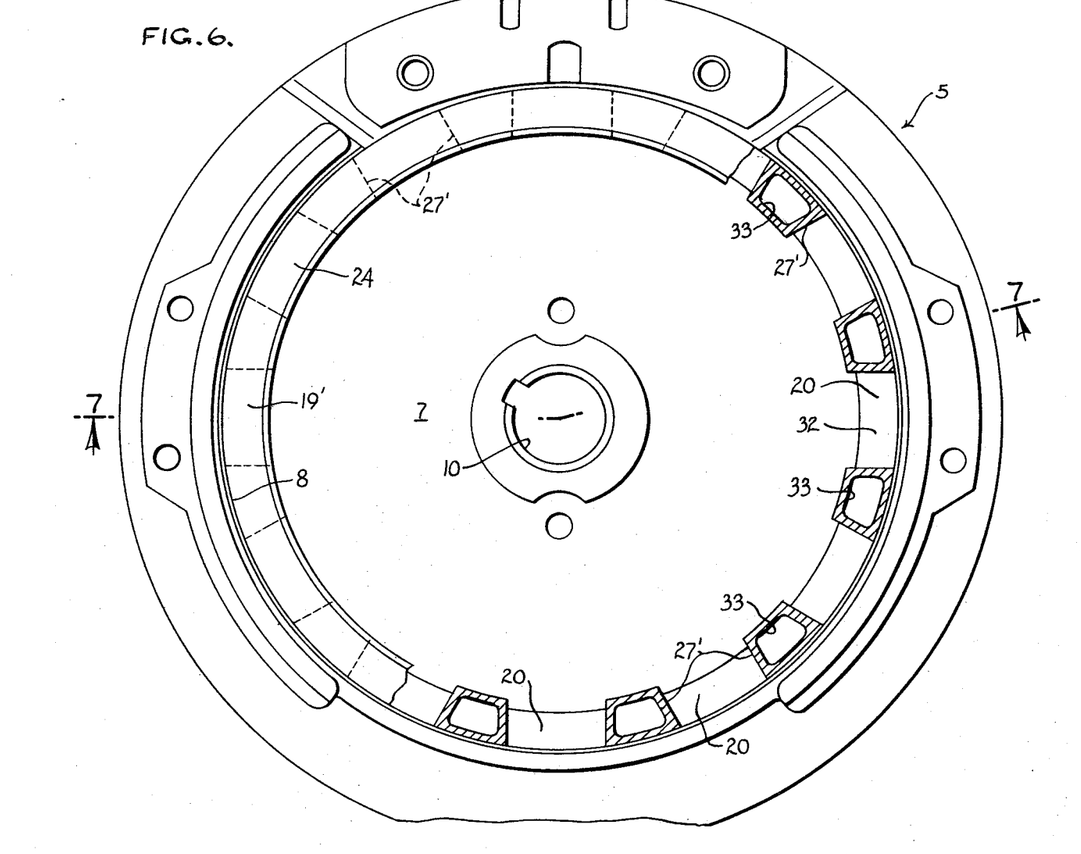
FIG. 6 is a plan view of a finished rotor embodying a modified form of the invention.
Figure 7:
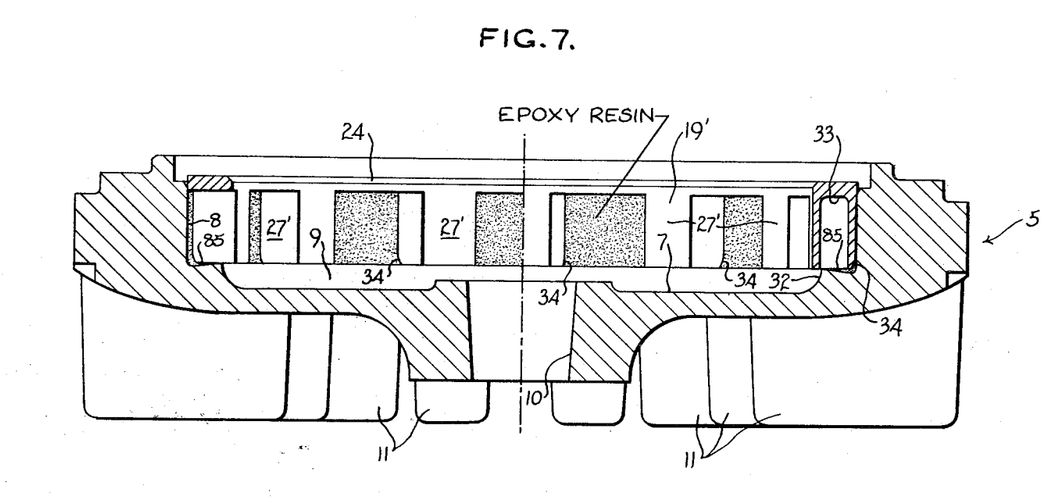
FIG. 7 is a sectional view taken on the plane of the line 7—7 in FIG. 6.

The modified form of cage 19' illustrated in FIGS. 6 and 7 is especially suitable for die casting in zinc or other nonmagnetic metal and thus makes for a rotor assembly that is satisfactory even though subjected to moderately varying temperature conditions. The metal cage also has the advantage of affording more protection to the magnet blocks than does the plastic cage. In the FIGS. 6 and 7 embodiment the rotor body 5 is provided with a circumferential ledge or shoulder 32 that extends radially inwardly from its side wall and is spaced a distance rearwardly from its end wall proper. The front surfaces 16 of the magnets seat on this ledge.

Since there is no space between the magnets and the front wall of the rotor body, the modified cage 19' comprises only a rear ring 24 that overlies the rear faces 17 of the magnet blocks and a plurality of box-like spacer portions 27' that are formed integrally with the rear ring and project forwardly from it. Each of the spacer portions is preferably cored to form a forwardly opening well 33 therein that saves both weight and material. The opposing pocket-defining surfaces on circumferentially adjacent spacer portions are again parallel to one another, as above described, rather than lying on true radials, to provide for radial insertion of the blocks 6 into the pockets 20 that are conjointly defined by the cage and the inner surface of the side wall 8.

In this case, since the cage has no front ring, the epoxy is relied upon to bond the cage 19' to the side wall 8 of the rotor body and prevent rearward displacement of the cage relative to it, and for this reason the box-like spacer portions 27' are formed with radially outer surfaces that are curved to mate with the inner surface of the side wall and are chamfered at their front edge portions, as at 34. As the cage is inserted axially into the rotor body, the chamfers 34 wipingly distribute an even coating of epoxy between the spacer portions of the cage and the inner surface of the body side wall.

Figure 10:
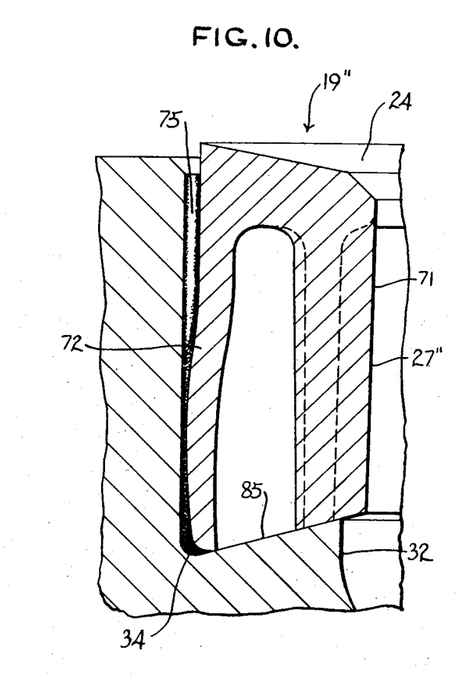
FIG. 10 is a greatly enlarged axial sectional view through a portion of a flywheel rotor incorporating the magnet cage of FIGS. 8 and 9, illustrating in exaggerated form the effects thereon of the heat used in curing the epoxy.

The junction of the side wall 8 of the rotor body with its end wall 9 whould be at a rounded corner, to insure structural strength to the rotor body and to avoid problems in machining it. However, the adjacent surfaces of the magnet blocks meet at a square corner. For this reason, as best seen in FIG. 10, the rearwardly offset ledge 32 upon which the blocks are seated has a surface 85 that is inclined forwardly and radially outwardly, so that the blocks rest on only the radially inner portion of that surface. When set in place, the blocks are of course held in their proper orientations by their flatwise engagement against the inner surface of the side wall.

Figure 8:
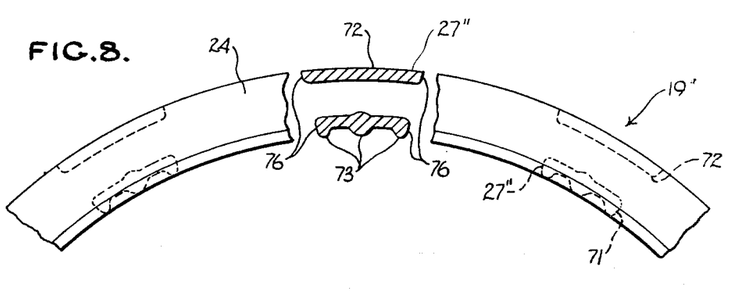
FIG. 8 is a fragmentary plan view of another modified form of magnet cage, with a portion shown broken away.
Figure 9:
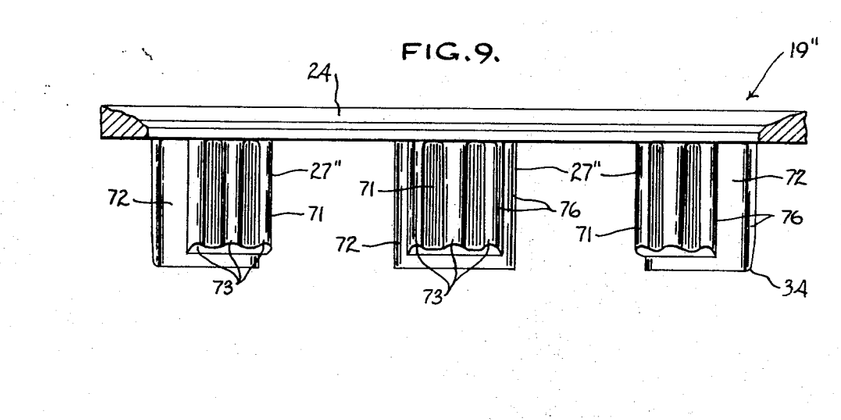
FIG. 9 is a fragmentary side view of the magnet cage shown in FIG. 8.

FIGS. 8 and 9 illustrate another form of cage 19" that is suitable for die casting in zinc or other metal, and which is well adapted for use where the epoxy resin that secures the cage and the magnet blocks to the rotor body is cured at a relatively high temperature. Like that illustrated in FIGS. 6 and 7, the cage of FIGS. 8 and 9 comprises a rear ring 24 that overlies the rear faces of the magnet blocks and a plurality of spacer portions 27" that are formed integrally with the rear ring and project forwardly from it between circumferentially adjacent magnet blocks.

In this case, however, each of the spacer portions comprises a radially inner finger 71 and a radially outer finger 72, each of the fingers being in the nature of a circumferentially extending wall portion. The radially inner finger 71 has axially extending ribs or flutings 73 that reinforce and stiffen it. The radially outer finger 72, however, is relatively thin, so that it has a slight degree of radial flexibility. Each radially outer finger has its front edge portion chamfered, as at 34, so that epoxy is wipingly distributed evenly across the radially outer surface of the finger 72 as the cage is inserted into the rotor.

During curing of the epoxy, the cage tends to expand slightly more than the rotor body, owing to the high temperature used in the curing operation and the fact that zinc has a higher coefficient of expansion than cast iron. As the assembly cools after the curing operation, the ring portion of the magnet cage shrinks away from the adjacent surface of the rotor body and tends to break the epoxy bond between the cage and the rotor body as indicated at 75 in FIG. 10. But because of the above mentioned slight flexibility of the radially outer finger 72, that finger can assume a slight S-curvature that allows its front end portion to remain well bonded to the rotor body, as at 76. It will be understood that in FIG. 10 the S-curve that is imparted to the finger is greatly exaggerated, as is the separation in the epoxy at 75.

It will be seen that the circumferential side edges of the front and rear fingers cooperate to define side surfaces of the block receiving pockets 20, as at 76, and have sufficient area to insure that the blocks will be properly located as they are installed in the cage.

For assembly of any of the above described cages into the rotor body, the latter will normally be oriented with its axis vertical and its end wall 7 lowermost, and it can remain in that orientation through the curing operation. The blocks 6 can be manually inserted into the pockets 20 just to the extent necessary to assure that they will not drop out of the pockets. However, the permanent magnets 6 are intended to be in a magnetic circuit with the permeable side wall 8 of the rotor body, and therefore in the finished rotor the distance between the inner surface of that side wall and the radially outer surface 14 of each magnet block should be as small as possible consistent with the presence of a thin bonding layer of epoxy between them. Hence when all of the blocks have been inserted, the above mentioned tool 21 is placed in the rotor body cavity and is actuated to force the blocks radially outwardly to their desired positions, exerting enough force upon the blocks to squeeze all excess epoxy out from between them and the rotor body side wall.

Figure 4:
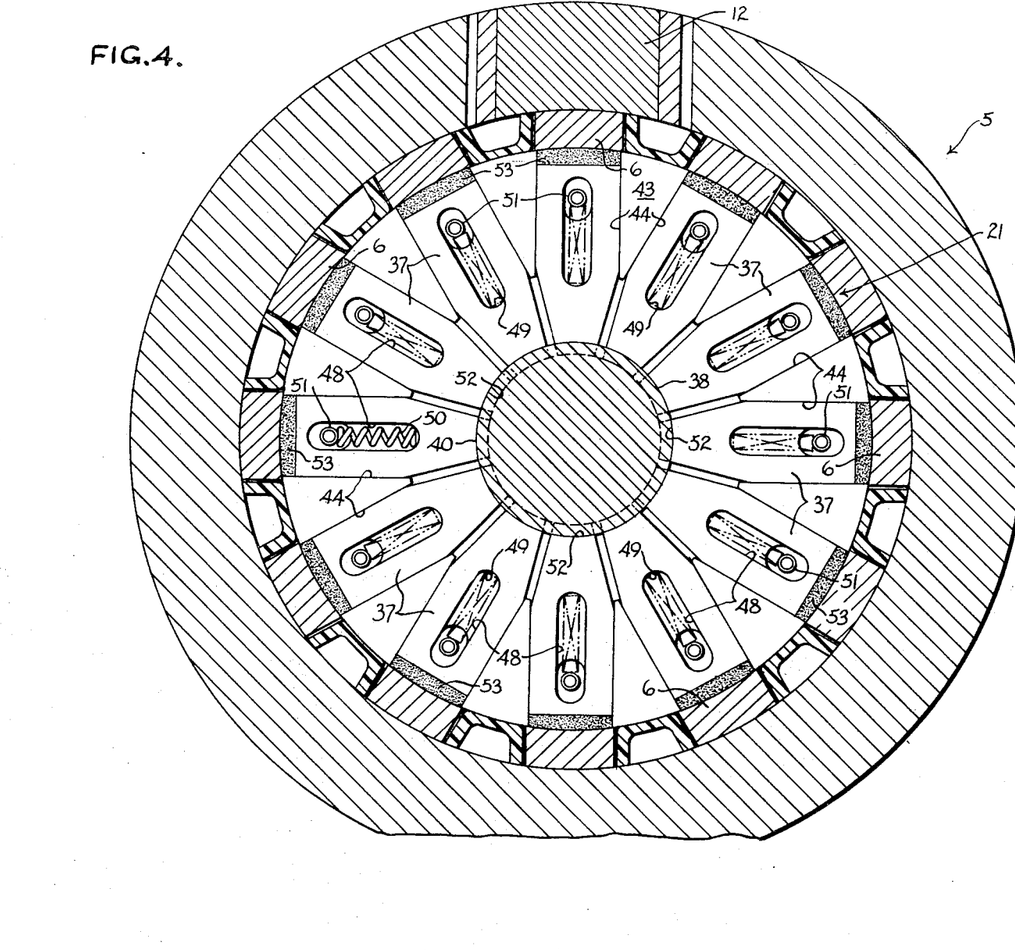
FIG. 4 is a sectional view taken on the plane of the line 4—4 in FIG. 3.

The tool 21 comprises, in general, a circular body 36 that has a diameter to be received within the cage annulus with a substantial radial clearance, a plurality of plungers 37 — one for each magnet block 6 — that are slidably guided in the body 36 for radially in and out motion, and a coaxial driver 38 which is slidable in the body 36 for up and down motion and which comprises an upper stem portion 39 and a lower frustoconical cam portion 40 that slidingly engages the inner ends of the plungers 37.

The body 36 of the tool can comprise two parts, namely, an upper part 41 that provides a boss 42 in which the stem portion of the driver is slidably guided, and a lower part 43 that has a plurality of radial slots 44, in each of which one of the plungers 37 is slidable. The cam portion 40 of the driver 38 is received in a counterbore 45 which extends axially through the lower body part and to which the slots 44 open at their radially inner ends, and which also extends partway up into the upper part of the body, where it communicates with a smaller diameter bore 46 that continues up through the boss and slidably guides the stem portion of the driver.

Each of the plungers 37 has a slot 48 therethrough, intermediate its ends and elongated lengthwise of the plunger, and has a radially outwardly facing shoulder 49. The plunger is biased radially inwardly by means of a coiled compression spring 50 which reacts between the shoulder 49 on the plunger and a pin 51 that is fixed in the tool body and extends through the slot 48 in the plunger. The radially inner end surface 52 of each plunger is inclined to correspond with the taper of the downwardly convergent frustoconical cam portion 40 of the driver, so that downward motion of the driver cams all of the plungers radially outwardly against the bias of their springs 50. A pad 53 of rubber or similar resilient material on the radially outer end of each plunger protects the magnet blocks from damage by the plunger and accommodates slight differences in the combined radial dimensions of the several blocks and plungers.

The driver 38 is preferably constrained to axial up and down motion by means of a pin 55 that is fixed in the boss portion of the body and extends transversely across the bore 46 through axially elongated slots in the driver stem portion. The upper end of the driver stem is preferably provided with an enlarged head 56 suitable for engagement by the ram of a hydraulic press or the like, by which the tool 21 can be actuated.

FIG. 5 illustrates an inexpensive fixture 57 which can be placed in the cage annulus immediately after the tool 21 is removed therefrom, and which can remain in the well 9 in the rotor all through the curing operation to maintain the magnet blocks in the positions in which the tool 21 has established them. The fixture 57 comprises a central disc or plate 58 from which spring fingers 59 project radially outwardly and upwardly. There is of course a spring finger 59 for each of the magnet blocks 6, and each spring finger be secured to the plate 58 by means of rivets 60 or the like. The fixture is merely inserted axially, plate lowermost, into the well 9 in the flywheel body, with its fingers substantially aligned with the magnet blocks, and the spring fingers, in engaging the magnet blocks under resilient bias, hold the fixture centered in the well.

The flywheel is preferably balanced after the bonding agent has been cured. Since balancing is accomplished by removing cast iron from its body, the blocks 6 are preferably installed in unmagnetized conditions so that they will not attract and collect chips produced during the balancing operation. The magnet blocks are magnetized in a known manner after the flywheel is balanced.

From the foregoing description taken with the accompanying drawings it will be apparent that this invention provides an extremely inexpensive method and means for securing magnet blocks to the inner side wall surface of a cup-shaped rotor body such as an engine flywheel, and for establishing the blocks in a predetermined relationship to one another and to the rotor body as they are being quickly and easily assembled with the flywheel.

Those skilled in the art will appreciate that the invention can be embodied in forms other than as herein disclosed for purposes of illustration.

The invention is defined by the following claims.

We claim:

1. A rotor which can serve as the flywheel of a reciprocating engine and as the movable portion of a dynamoelectric machine and which comprises a body with a magnetically permeable annular wall and a plurality of block-like permanent magnets fixed to the body in circumferentially spaced relation to one another and defining a magent ring adjacent to the radially inner surface of said wall, said rotor being characterized by:

A. each of the magnets being bonded to the body by a layer of bonding agent between its radially outer surface and the radially inner surface of said wall of the body;
   B. the magnets being steadied and protected by an annular cage of nonmagnetic material disposed radially inside said wall of the body and which comprises
      1. a ring that overlies an axially facing surface of each magnet and
      2. spacer portions that extend axially in one direction from said ring, between circumferentially adjacent magnets, said ring and spacer portions of the cage cooperating with inner body surfaces to define radially inwardly opening pockets into which the magnets are insertable during assembly and by which they are retained in position during curing of the bonding agent.

2. The rotor of claim 1, further characterized by:
   C. said spacer portions of the cage having their radially inner surfaces substantially flush with those of the magnets.

3. The rotor of claim 1 wherein said body also comprises an end wall which cooperates with said annular wall to define a rearwardly opening well, and wherein said ring of the cage overlies the rear faces of the magnets and the magnets are spaced to the rear of said end wall of the body, further characterized by:
   C. the cage comprising a second ring connected with the front ends of the spacer portions and disposed between the front surfaces of the magnets and said end wall of the body to establish the spacing between the magnets and said end wall and to seal off the space thus established; and
   D. the radially inner surface of said second ring and the radially inner surfaces of the spacer portions being substantially flush with the radially inner surfaces of the magnets.

4. The rotor of claim 1 wherein the body has a circumferential ledge adjacent to its said annular wall that faces axially toward said ring of the cage and which is flatwise overlain by the opposite axially facing surface of each magnet, further characterized by:
   C. each of said spacer portions comprising a wall portion with a radially outer surface which is curved to mate with the radially inner surface of said annular wall of the body and which is bonded to the latter by said bonding agent; and
   D. that edge portion of each of said spacer portion walls which is adjacent to the ledge being chamfered to wipingly distribute bonding agent evenly between said spacer portion wall and said annular wall as the cage is inserted axially into the annular wall.

5. The rotor of claim 4, further characterized by:
   E. each of said wall portions being relatively thin in the direction radially of the rotor, to be slightly flexible; and
   F. each spacer portion further comprising a second wall portion spaced radially inwardly from the first mentioned wall portion and with which the first mentioned wall portion is connected substantially only through said ring.

6. In combination:
A. a rotor body which can serve as the flywheel of a reciprocating engine and which has an end wall and a magnetically permeable annular wall that together define a rearwardly opening well; and
B. means for establishing a plurality of permanent magnet blocks in radially inward proximity to the annular wall and in circumferentially spaced relationship to one another, to provide for bonding the blocks to the radially inner surface of said annular wall, as by means of an epoxy, so that the blocks will form a magnet ring for a dynamoelectric machine such as an alternator, the last mentioned means comprising an annular cage of nonmagnetic material received within the well and cooperating with the rotor body to define a plurality of radially inwardly opening pockets, into each of which one of the blocks is radially outwardly insertable, said cage comprising
   1. a ring adapted to define one surface of each pocket that faces in one axial driection, and
   2. a plurality of spacer portions that extend from the ring in said axial direction, circumferentially adjacent spacer portions providing other surfaces of the pocket that oppose one another and face generally circumferentially, said other surfaces of the pocket being spaced at least as far apart at their radially inner edges as at their radially outer edges so that they can closely embrace opposite surfaces of a block received between them.

* * * * *